US006657011B2

(12) United States Patent
Lau et al.

(10) Patent No.: US 6,657,011 B2
(45) Date of Patent: Dec. 2, 2003

(54) ADHESIVE COMPOSITIONS CONTAINING LOW MOLECULAR WEIGHT POLYMERIC ADDITIVES

(75) Inventors: Willie Lau, Ambler, PA (US); Kim Sang Ho, Richboro, PA (US); Paul Ralph Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/951,371

(22) Filed: Sep. 13, 2001

(65) Prior Publication Data

US 2002/0055587 A1 May 9, 2002

Related U.S. Application Data

(60) Provisional application No. 60/232,414, filed on Sep. 14, 2000, and provisional application No. 60/253,165, filed on Nov. 27, 2000.

(51) Int. Cl.$^7$ ............................................... C08L 33/02
(52) U.S. Cl. ........................................ 525/221; 524/522
(58) Field of Search ............................ 525/221; 524/522

(56) References Cited

U.S. PATENT DOCUMENTS

| | | | |
|---|---|---|---|
| 3,867,481 A | 2/1975 | Whang | 260/899 |
| 4,056,559 A | 11/1977 | Lewis et al. | 526/212 |
| 4,912,169 A | 3/1990 | Whitmire et al. | 525/221 |
| 5,006,582 A | 4/1991 | Mancinelli | |
| 5,028,677 A | 7/1991 | Janowicz | 526/329 |
| 5,100,963 A * | 3/1992 | Lin | 525/221 |
| 5,247,040 A | 9/1993 | Amick et al. | 526/286 |
| 5,264,530 A | 11/1993 | Darmon et al. | 526/194 |
| 5,521,266 A | 5/1996 | Lau | 526/200 |
| 5,578,683 A | 11/1996 | Koch et al. | 525/301 |
| 5,602,220 A | 2/1997 | Haddleton et al. | 526/172 |
| 5,756,605 A | 5/1998 | Moad et al. | 526/93 |
| 5,804,632 A | 9/1998 | Haddleton et al. | 524/458 |
| 5,936,026 A | 8/1999 | Huybrechts et al. | |
| 5,981,642 A | 11/1999 | Overbeek et al. | |

FOREIGN PATENT DOCUMENTS

| | | |
|---|---|---|
| JP | 543136 | 1/1979 |
| WO | WO99/03905 | 1/1999 |

OTHER PUBLICATIONS

Applications of Anionic Polymerization Research, R. P. Quirk Ed, ACS Symp. Ser. 696, 208(1998); "Practical Applications of Macromonomer Techniques for the Synthesis of Comb–Shaped Copolymers", Authors S. Roos, A.H. E. Muller, M. Kaufmann, W. Siol, C. Auschra.

Journal of Polymer Science Part A: Polymer Chemistry, vol. 34, 3173 3181; "Compatibilization of the PBA/PMMA Core/Shell Latex Interphase, I. Partitioning of PMMA Macromonomer in the PBA Seed Latex", Authors, V. Nelliappan, M. S. El–aasser, A. Klein, E. S. Daniels, and J. E. Roberts.

J. Macromol Sci.—Chem. A27(4) pp. 491–507 (1990), "Copolymerization of Polymethyl Methacrylate Macromers with n–Butyl Acrylate and Mechanical Properties Of the Graft Copolymers", Authors Hong–Quan Xie and Shi–Biao Zhou.

Research Disclosure, Jun. 1995, "Low Molecuar Weight (Meth) Acrylic Copolymers," 366.

Adhesives Age, Jul. 1997, pp. 19–23; The Effects of Tackification on Waterborne Acrylic PSA's Timothy G. Wood.

Tackifier Resins, "Handbook of Pressure–Sensitive Adhesive Technology", pp. 353–369, James A. Schlademan.

* cited by examiner

*Primary Examiner*—Bernard Lipman
(74) *Attorney, Agent, or Firm*—Richard R. Clikeman

(57) ABSTRACT

Adhesive compositions comprising (a) adhesive polymers or copolymers prepared from monomers selected from the group consisting of styrene, butadiene, acrylonitrile, ethylene, vinyl acetate, acrylic acid, esters of acrylic acid, methacrylic acid and esters of methacrylic acid or combinations thereof; and (b) from 1 to 55% on a dry weight basis of a polymeric additive comprising a low molecular weight polymer having a number average molecular weight of 20,000 or less and which comprises polymerized units of at least one ethylenically unsaturated monomer and 5 weight percent or less of a polymerized acid-containing monomer. In preferred form, the polymeric additive is polymerized in the presence of a metal chelate chain transfer agent. In certain embodiments, the polymeric additive has a midpoint $T_g$ of at least 0° C. or greater. Further embodiments of the present invention include methods for forming the polymeric additive in situ in the adhesive composition.

19 Claims, No Drawings

ADHESIVE COMPOSITIONS CONTAINING LOW MOLECULAR WEIGHT POLYMERIC ADDITIVES

CROSS REFERENCE TO RELATED PATENT APPLICATIONS

This is a non-provisional application of prior U.S. provisional application serial No. 60/232,414 filed Sep. 14, 2000 and U.S. provisional application serial No. 60/253,165 filed Nov. 27, 2000.

The present invention relates generally to improved adhesive compositions. More particularly, the present invention relates to improved adhesive compositions containing low molecular weight, polymeric additives and methods for forming the same.

The properties of tack, peel strength and shear resistance, which are frequently mutually exclusive properties, may be highly important in tailoring an adhesive composition that is suitable for a particular application. Tack is generally a measure of viscous flow under conditions of fast strain rates and low stress magnitudes. Peel strength is a measure of resistance to flow at intermediate strain rates and moderate to high stress magnitudes, as well as the cohesive strength of the adhesive. Shear resistance is a measure of resistance to flow at intermediate stress magnitudes.

Polymeric additives, such as tackifiers or plasticizers, are often added to adhesive compositions to modify the properties of the adhesive including, for example, the viscoelastic behavior of the finished adhesive. The particular polymeric additive selected may vary depending, for example, on the adhesive involved and the modification sought.

Traditionally, natural and synthetic rubbers have been used as pressure-sensitive adhesives, but these rubbers alone may not have the necessary balance of properties of tack, shear, and peel adhesion. For example, rubber-based adhesives typically require the addition of tackifiers, such as rosin acid derivatives or aliphatic/aromatic resins, to impart useful properties as pressure-sensitive adhesives.

Acrylic polymers have also been useful as pressure-sensitive adhesives. Acrylic polymers have typically not required compounding with tackifier resins to achieve desirable pressure sensitive characteristics. Recently, however, it has been shown that tackifiers may provide a convenient and useful tool for modifying pressure-sensitive adhesives as discussed by T. G. Wood, "The Effects of Tackification on Waterborne Acrylic Pressure-Sensitive Adhesive", Adhesive Age, Vol. 30, pp. 19–23 (1987). The Handbook of Pressure-Sensitive Adhesive Technology, edited by Don Satas, Van Nostrand Reinhold Co., pp 353–369, (1982) provides a discussion on pressure-sensitive adhesives. This reference teaches, inter alia, that the addition of tackifiers to acrylic, pressure-sensitive adhesive polymers may improve the performance characteristics for these materials.

Generally speaking, to enhance performance characteristics of adhesive compositions, the tackifier should possess a certain range of properties with respect to the adhesive polymer or copolymer to which it is added. For example, the tackifier should generally have a lower molecular weight as compared to that of the adhesive polymer or copolymer. In addition, the tackifier should generally have a glass transition temperature ($T_g$) that is higher than that of the adhesive polymer or copolymer. The softening temperature of the tackifier should generally be higher than that of the adhesive polymer or copolymer, and the tackifier should generally have a minimum degree of compatibility with the adhesive polymer or copolymer.

Plasticizers may be added to an adhesive composition, for example, to increase its workability, flexibility, and/or distensibility. Depending upon the involved adhesive system, the addition of a plasticizer may lower the melt viscosity, elastic modulus, and glass transition temperature ($T_g$) of the overall system. Plasticizers may also be added to polymer formulations to increase flexibility by promoting bond formation between polymer molecules and the plasticizer rather than between the polymer molecules themselves. In doing so, the plasticizer may also increase the specific volume and change the index of refraction of the resulting composition. The addition of the plasticizer to the adhesive composition may also raise the viscosity of the adhesive system.

Japanese Patent Disclosure No. 54-3136 discloses a pressure-sensitive adhesive containing an acrylic polymer and a tackifier. The tackifier is prepared by solution polymerizing 25 to 75 weight % of vinyl aromatic compound and 75 to 25 weight % acrylic or methacrylic acid ester. The disclosed tackifier has a number average molecular weight of 500 to 3,000 and a softening point of less than 40° C.

U.S. Pat. No. 3,867,481 discloses a low molecular weight acrylic polymer containing (1) an alkyl methacrylate and (2) one or more additional acrylic methacrylic acid ester and/or a styrene for use as a processing modifier for rigid polyvinyl halide resins.

U.S. Pat. No. 4,056,559 discloses low molecular weight polymers of alkyl methacrylates having an average chain length of about 6 to about 50 mers and having a variety of uses in films, coatings, adhesives and inks.

U.S. Pat. No. 4,912,169 discloses low molecular weight tackifiers that have a number average molecular weight less than about 35,000 and a softening point greater than about 40° C. The tackifiers are prepared with high levels, or 1 to 20 mole percent, of chain transfer agents such as $C_1$–$C_{15}$ alkyl mercaptans, benzyl mercaptan, 3-mercaptoproprionic acid and esters thereof, mercaptoethanol, benzyl alcohol, alpha-methyl benzyl alcohol, and ethyl mercaptoacetate.

Mercaptans are often effective for use as chain transfer agents and in reducing the molecular weight of polymers. Such uses of mercaptans is problematic, however, due to, inter alia, the expense of these materials and their frequently offensive odors. Moreover, the use of mercaptans during processing can impart thiol functionalities into the resulting polymer, thereby affecting the properties of the polymer. The use of other common chain transfer agents such as, for example, hypophosphites, sulfates, and alcohols, may also be undesirable in that they may add to the cost of the process, impart undesired functionality to the polymer, introduce undesired salts into the process, and introduce additional process steps, including product separation.

The present invention seeks to provide improved adhesive compositions containing polymeric additives for use, for example, as adhesives. The polymeric additives of the present invention can be prepared without the use of high levels of chain transfer agents. Moreover, the polymeric additives of the present invention can be prepared without mercaptans or alcohols as chain transfer agents.

The present invention is directed, in part, to improved adhesive compositions. Specifically, in one embodiment, there are provided adhesive compositions comprising (a) adhesive polymers or copolymers prepared from monomers selected from the group consisting of styrene, butadiene, acrylonitrile, ethylene, vinyl acetate, acrylic acid, esters of acrylic acid, methacrylic acid, esters of methacrylic acid and combinations thereof; and (b) from 1 to 55% on a dry weight basis of a polymeric additive comprising a low molecular weight polymer having a number average molecular weight of 20,000 or less and which comprises: (i) polymerized units of at least one ethylenically unsaturated monomer; and (ii) 5 weight percent or less of a polymerized acid-containing monomer wherein the polymeric additive is polymerized in the presence of a metal chelate chain transfer agent.

Another aspect of the invention relates to a method of modifying one or more properties of an adhesive comprising combining with the adhesive polymer or copolymer from 1 to 55% on a dry weight basis of a polymeric additive comprising a low molecular weight polymer having a number average molecular weight of 20,000 or less and which comprises: (i) polymerized units of at least one ethylenically unsaturated monomer; and (ii) 5 weight percent or less of a polymerized acid-containing monomer wherein the polymeric additive is polymerized in the presence of a metal chelate chain transfer agent.

Still another aspect of the invention relates to methods for the in-situ generation of a polymeric additive within an adhesive composition, the method comprising: (a) polymerizing at least one first ethylenically unsaturated monomer to form an adhesive polymer or copolymer; (b) polymerizing, in the presence of said adhesive polymer or copolymer, a polymeric additive comprising a low molecular weight polymer having a number average molecular weight of 20,000 or less and which comprises: (i) polymerized units of at least one second ethylenically unsaturated monomer; and (ii) 5 weight percent or less of a polymerized acid-containing monomer, wherein said polymeric additive is formed in the presence of a metal chelate chain transfer agent.

These and other aspects of the invention will become more apparent from the following detailed description.

The present invention is directed to improved adhesive compositions containing relatively low molecular weight polymer additives. The present adhesive compositions exhibit an improved balance of properties in comparison to adhesive compositions of the prior art. In particular, the adhesive compositions of this invention may exhibit an improved balance of tack, peel strength and shear resistance, preferably without the problems in clarity, color, and UV resistance caused when typical rosin or hydrocarbon tackifiers are used. In addition, in certain embodiments, the present invention also provides methods of preparing adhesive compositions wherein the polymeric additive is generated in situ during the formation of the adhesive polymer or copolymer.

In certain preferred embodiments, the low molecular weight polymer is in the form of a macromonomer. The term "macromonomer", as used herein, refers to any low molecular weight water-insoluble polymer or copolymer that may be capable of being polymerized in a free radical polymerization process. The term "water-insoluble", as used herein, means that the macromonomer has a water solubility of no greater than 150 millimoles/liter at 25° C. to 50° C. The term "low molecular weight", as used herein, means that the macromonomer has a number average molecular weight of 20,000 or less. More preferably, the number average molecular weight of the macromonomer is 9,000 or less. Even more preferably, the number average molecular weight of the macromonomer is from m 600 to 6000, with number average molecular weights of from 600 to 4000 being still more preferred.

The low molecular weight polymer contains, as polymerized units, at least one type of ethylenically unsaturated monomer. Preferably, the ethylenically unsaturated monomer is selected to impart low or no water solubility to the low molecular weight polymer as previously described herein.

Suitable ethylenically unsaturated monomers for use in preparing the low molecular weight polymers employed in the methods and compositions of the present invention include, for example, methacrylate esters, such as $C_1$ to $C_{18}$ normal or branched alkyl esters of methacrylic acid, including methyl methacrylate, ethyl methacrylate, n-butyl methacrylate, lauryl methacrylate, stearyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; basic substituted (meth)acrylates and (meth)acrylamides, such as amine-substituted methacrylates including dimethylaminoethyl methacrylate, tertiary-butylaminoethyl methacrylate and dimethylaminopropyl methacrylamide and the likes; dienes such as 1,3-butadiene and isoprene; vinyl ethers; or combinations thereof. The term "(meth)", as used herein, means that the "meth" is optionally present. For example, "(meth)acrylate" means methacrylate or acrylate.

The ethylenically unsaturated monomer can also be a functional monomer including, for example, monomers containing such functional groups as hydroxy, amido, aldehyde, ureido, polyether, glycidylalkyl, keto and combinations thereof. These functional monomers are generally present in the low molecular weight polymer at a level of from 0.5 weight percent to 15 weight percent and more preferably from 1 weight percent to 3 weight percent, based on the total weight of the low molecular weight polymer. Examples of functional monomers include, for example, ketofunctional monomers, such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomers can provide crosslinking, if desired.

The low molecular weight polymer also contains as polymerized units 10 weight percent or less, preferably 5 weight percent or less, more preferably 2 weight percent or less and most preferably 1 weight percent or less acid containing monomer, based on the total weight of the low molecular weight polymer. In a particularly preferred embodiment, the low molecular weight polymer contains no acid containing monomer. The term "acid containing monomer", as used herein, refers to any ethylenically unsaturated monomer that contains one or more acid functional groups or functional groups that are capable of forming an acid (e.g., an anhydride such as methacrylic anhydride or tertiary butyl methacrylate). Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof.

As polymerized, the low molecular weight polymer is substantially (including completely) free of mercapto-olefin compounds. The term "substantially free", as used herein, means that the low molecular weight polymer contains, as polymerized, less than 5 mole percent mercapto-olefin compounds, based on the total weight of the low molecular weight polymer. Preferably, the macromomer contains less than 2 mole percent mercapto-olefin compounds, with less than 1 mole percent being more preferred. Even more preferably, the low molecular weight polymer contains less than 0.5 mole percent mercapto-olefin compounds. In certain particularly preferred embodiments, the low molecular weight polymer contains completely no (i.e., 0 mole percent) mercapto-olefin compounds. Some examples of mercapto-olefin compounds are those compounds described in U.S. Pat. No. 5,247,000 to Amick. The mercapto-olefin compounds described in Amick have ester functional groups, which are susceptible to hydrolysis.

In a preferred embodiment of the present invention, the low molecular weight polymer is composed of at least 20 weight percent, more preferably from 50 weight percent to 100 weight percent, and even more preferably from 80 to 100 weight percent of at least one α-methyl vinyl monomer, a non "α-methyl vinyl monomer terminated with a "α-methyl vinyl monomer, or combinations thereof. In a particularly preferred embodiment of the present invention, the low molecular weight polymer contains as polymerized units from 90 weight percent to 100 weight percent α-methyl vinyl monomers, non "α-methyl vinyl monomers terminated with "α-methyl vinyl monomers, or combinations thereof, based on the total weight of the low molecular weight polymer. Suitable α-methyl vinyl monomers include, for example, methacrylate esters, such as $C_1$ to $C_{18}$ normal or branched alkyl esters of methacrylic acid, including methyl methacrylate, ethyl methacrylate, butyl methacrylate, 2-ethylhexyl methacrylate, isobornyl methacrylate, lauryl methacrylate, or stearyl methacrylate; hydroxyalkyl methacrylates such as hydroxyethyl methacrylate; glycidylmethacrylate; phenyl methacrylate; methacrylamide; methacrylonitrile; or combinations thereof. An example of a non "α-methyl vinyl monomer terminated with an "α-methyl vinyl monomer includes styrene terminated by "α-methyl styrene.

The low molecular weight polymers useful in the present invention may be prepared by polymerizing ethylenically unsaturated monomers in the presence of a free radical initiator and a catalytic metal chelate chain transfer agent (e.g., a transition metal chelate). Such a polymerization may be carried out by a solution, bulk, suspension, or emulsion polymerization process. Suitable methods for preparing the low molecular weight polymer using a catalytic metal chelate chain transfer agent are disclosed, for example, in U.S. Pat. Nos. 4,526,945, 4,680,354, 4,886,861, 5,028,677, 5,362,826, 5,721,330, and 5,756,605; European publications EP-A-0199,436, and EP-A-0196783; and PCT publications WO 87/03605, WO 96/15158, and WO 97/34934.

In accordance with preferred embodiments of the present invention, the low molecular weight polymer may be prepared by an aqueous emulsion free radical polymerization process. It has been surprisingly and unexpectedly found that this polymerization process may be advantageously carried out without the use of prior art chain transfer agents such as, for example, mercaptans, hypophosphites, sulfates, and alcohols. Such prior art chain transfer agents may be undesirable in that they may exhibit offensive odors that may be imparted to the polymer, and may also add to the cost of the process, impart undesired functionality to the polymer, introduce undesired salts into the process, and introduce additional process steps, including product separation.

The aqueous emulsion free radical polymerization process is preferably conducted using a transition metal chelate complex as a chain transfer agent. Preferably, the transition metal chelate complex is a cobalt (II) or (III) chelate complex such as, for example, dioxime complexes of cobalt, cobalt II porphyrin complexes, or cobalt II chelates of vicinal iminohydroxyimino compounds, dihydroxyimino compounds, diazadihydroxy-iminodialkyldecadienes, or diazadihydroxyiminodialkylundecadienes, or combinations thereof. These complexes may optionally include bridging groups such as $BF_2$, and may also be optionally coordinated with ligands such as water, alcohols, ketones, and nitrogen bases such as pyridine. Additional suitable transition metal complexes are disclosed, for example, in U.S. Pat. Nos. 4,694,054; 5,770,665; 5,962,609; and 5,602,220. A preferred cobalt chelate complex useful in the preparation of the low molecular weight polymers of the present invention is Co II (2,3-dioxyiminobutane-$BF_2$)$_2$, the Co III analogue of the aforementioned compound, or combinations thereof. The spatial arrangements of such complexes are disclosed, for example, in EP-A-199436 and U.S. Pat. No. 5,756,605.

In preparing the low molecular weight polymer by an aqueous emulsion polymerization process using a transition metal chelate chain transfer agent, at least one ethylenically unsaturated monomer is polymerized in the presence of a free radical initiator and the transition metal chelate according to conventional aqueous emulsion polymerization techniques. Preferably, the ethylenically unsaturated monomer is an α-methyl vinyl monomer as previously described herein.

The polymerization reaction to form the low molecular weight polymer is preferably conducted at a temperature of from 20° C. to 150° C., and more preferably from 40° C. to 95° C. The solids level at the completion of the polymerization is typically from 5 weight percent to 65 weight percent, and more preferably from 30 weight percent to 55 weight percent, based on the total weight of the aqueous emulsion.

The concentration of initiator and transition metal chelate chain transfer agent used during the polymerization process is preferably chosen to obtain the desired degree of polymerization of the low molecular weight polymer. Preferably, the concentration of initiator is from 0.2 weight percent to 3 weight percent, and more preferably from 0.5 weight percent to 1.5 weight percent, based on the total weight of monomer. Preferably, the concentration of transition metal chelate chain transfer agent is from 5 ppm to 200 ppm, and more preferably from 10 ppm to 125 ppm, based on the total moles of monomer used to form the low molecular weight polymer.

The ethylenically unsaturated monomer, initiator, and transition metal chelate chain transfer agent may be combined in any manner known to those skilled in the art to carry out the polymerization. For example, the monomer, initiator and transition metal chelate may all be present in the aqueous emulsion at the start of the polymerization process (i.e., a batch process). Alternatively, one or more of the components may be gradually fed to an aqueous solution (i.e., a continuous or semi-batch process). For example, it may be desired to gradually feed the entire or a portion of the initiator, monomer, and/or transition metal chelate to a solution containing water and surfactant. In a preferred embodiment, at least a portion of the monomer and transition metal chelate are gradually fed during the polymerization, with the remainder of the monomer and transition metal chelate being present in the aqueous emulsion at the start of the polymerization. In this embodiment, the monomer may be fed as is, or suspended or emulsified in an aqueous solution prior to being fed.

Any suitable free radical initiator may be used to prepare the low molecular weight polymer. The initiator is preferably selected based on such parameters as its solubility in one or more of the other components (e.g., monomers, water); half life at the desired polymerization temperature (preferably a half life within the range of from 30 minutes to 10 hours), and stability in the presence of the transition metal chelate. Suitable initiators include for example azo compounds such as 2,2'-azobis(isobutyronitrile), 4,4'-azobis (4-cyanovaleric acid), 2,2'-azobis [2-methyl-N-(1,1-bis (hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof. Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. Metal promoters, such as iron, may also optionally be used in such redox initiator systems. Also, buffers, such as sodium bicarbonate may be used as part of the initiator system.

An emulsifier is also preferably present during the aqueous emulsion polymerization process to prepare the low molecular weight polymer. Any emulsifier may be used that is effective in emulsifying the monomers such as for example anionic, cationic, or nonionic emulsifiers. In a preferred embodiment, the emulsifier is anionic such as for example sodium, potassium, or ammonium salts of dialkyl-sulphosuccinates; sodium, potassium, or ammonium salts of sulphated oils; sodium, potassium, or ammonium salts of alkyl sulphonic acids, such as sodium dodecyl benzene sulfonate; sodium, potassium, or ammonium salts of alkyl sulphates, such as sodium lauryl sulfate; ethoxylated alkyl ether sulfates; alkali metal salts of sulphonic acids; $C_{12}$ to $C_{24}$ fatty alcohols, ethoxylated fatty acids or fatty amides; sodium, potassium, or ammonium salts of fatty acids, such as Na stearate and Na oleate; or combinations thereof. The amount of emulsifier in the aqueous emulsion is preferably from 0.05 weight percent to 10 weight percent, and more preferably from 0.3 weight percent to 3 weight percent, based on the total weight of the monomers.

The low molecular weight polymer aqueous emulsion useful in the present invention may be formed in any manner known to those skilled in the art. For example, the low molecular weight polymer, produced by any known method, may be isolated as a solid and emulsified in water. Also, for example, the low molecular weight polymer, if prepared via an emulsion or aqueous based polymerization process, may be used as is, or diluted with water or concentrated to a desired solids level.

In a preferred embodiment of the present invention, the low molecular weight polymer aqueous emulsion is formed from the emulsion polymerization of an ethylenically unsaturated monomer in the presence of a transition metal chelate chain transfer agent as described previously herein. This embodiment is preferred for numerous reasons. For example, the low molecular weight polymer polymerization can be readily controlled to produce a desired particle size distribution (preferably narrow, e.g., polydispersity less than 2). Also, for example, additional processing steps, such as isolating the low molecular weight polymer as a solid, can be avoided, leading to better process economics. In addition, the low molecular weight polymer, low molecular weight polymer aqueous emulsion and the adhesive composition may be prepared by consecutive steps in a single reactor which is desirable in a commercial manufacturing facility.

The low molecular weight polymer aqueous emulsion useful in the present invention contains from 20 weight percent to 60 weight percent, and more preferably from 30 weight percent to 50 weight percent of at least one water insoluble low molecular weight polymer, based on the total weight of low molecular weight polymer aqueous emulsion. The low molecular weight polymer aqueous emulsion may also contain mixtures of low molecular weight polymer. Preferably, the low molecular weight polymer aqueous emulsion contains 5 weight percent or less, and more preferably 1 weight percent or less of ethylenically unsaturated monomer, based on the total weight of low molecular weight polymer aqueous emulsion.

The water insoluble low molecular weight polymer particles have a particle size that allows it to be compatible to the adhesive compositions of the desired particle size. Preferably, the low molecular weight polymer particles have a weight average particle size of from 50 nm to 600 nm, and more preferably from 80 nm to 200 nm as measured by Capillary Hydrodynamic Fractionation technique using a Matec CHDF 2000 particle size analyzer equipped with a HPLC type Ultra-violet detector.

The low molecular weight polymer aqueous emulsion may also include one or more emulsifying agents. The type and amount of emulsifying agent is preferably selected in a manner to produce the desired particle size. Suitable emulsifying agents include those previously disclosed for use in preparing the low molecular weight polymer by an emulsion polymerization process. Preferred emulsifying agents are anionic surfactants such as, for example, sodium lauryl sulfate, sodium dodecylbenzene sulfonate, sulfated and ethoxylated derivatives of nonylphenols and fatty alcohols. The total level of emulsifying agent, based on the total weight of low molecular weight polymer is preferably from 0.2 weight percent to 5 weight percent and more preferably from 0.5 weight percent to 2 weight percent.

The ability of a polymeric additive to improve the performance of adhesive compositions may depend, for example, on the molecular weight of the polymeric additive, or the degree of compatibility between the additive and the adhesive polymer or copolymer. Compatibility, as used herein, refers to a measure of the mutual solubility of the two materials. Compatible blends may be characterized by (1) the existence of a single homogeneous phase which contains no discrete domains of either component, and (2) a single glass transition temperature for the blend of components as discussed. See, e.g., P. B. Rim and E. B. Orler, "Dependence of $T_g$ on Composition for a Compatible Polymer/Oligomer Blend", Macromolecules, Vol. 20, pp. 433–435 (1987). A further aspect of compatibility relates to the differences in refractive indices between the polymeric additive and the adhesive polymer or copolymer. A lack of compatibility is generally evidenced by haziness in the dried film (which shows different refractive indices) and a decrease in tack. Compatibility is typically favored between materials that are similar in chemical and/or physical characteristics. To effectively modify the performance of an adhesive, the polymeric additives preferably demonstrate an appreciable degree of compatibility with the adhesive polymer, although complete compatibility is not necessary. It is preferable, however, that the polymeric additive and the adhesive polymer be at least partially compatible.

It is generally desirable to optimize the balance of properties of an adhesive such as peel strength, shear strength, tack, and film clarity. All of these properties are important to adhesive compositions and the best advantages are achieved where the overall balance of these properties have been optimized. To achieve the necessary balance of adhesive properties, the polymeric additive of this invention preferably has a number average molecular weight of 20,000 or less. More preferably, the number average molecular weight of the polymeric additive is 9,000 or less. Even more preferably, the number average molecular weight of the polymeric additive is from 600 to 6000, with number average molecular weights of from 600 to 4000 being still more preferred.

In embodiments in which the polymeric additive is a tackifier, desirably enhanced peel strength and tack of the adhesive composition may be achieved when the polymeric additive preferably has a midpoint glass transition temperature ($T_g$) of 0° C. or greater. The $T_g$ values set forth herein are based on measured values obtained, for example, by differential scanning calorimetry of the respective polymer. On the other hand, polymeric additives of the present invention with a midpoint $T_g$ below 0° C. will work effectively as plasticizers in the adhesive composition.

The polymeric additive of this invention can be added to the adhesive polymers or copolymers by any suitable technique, such as by mixing or blending, to uniformly incorporate the additive into the adhesive compositions. The additive is preferably added to the adhesive composition in the form of an aqueous emulsion or an emulsified solution. In more preferred embodiments, the adhesive composition of the present invention is made by adding the polymeric additive and any other components of the adhesive composition to an aqueous emulsion containing the adhesive polymer or copolymer and agitating the combination to form a substantially uniform emulsion. The polymeric additives of the present invention can also be added to adhesive polymers involving solvents or solids, such as hot melt systems. An effective amount of the polymeric additive typically ranges from 1% to 55%, preferably 2.5% to 40%, and more preferably 7.5% to 30%, by weight based on the total dry weight of the adhesive composition.

The polymeric additives of the present invention may be used in a variety of adhesive compositions, including, but not limited to, pressure sensitive adhesives, construction adhesives, contact adhesives, hot melts, or solvent-based adhesive systems. The adhesive compositions may contain rubbers, such as isoprene and acrylonitrile-butadiene-styrene and polymers or copolymers prepared from styrene, butadiene, ethylene, vinyl acetate, acrylic acid or esters thereof, methacrylic acid or esters, or combinations thereof. Preferably, the adhesive composition comprises polymers or copolymers prepared from acrylic or methacrylic acid or esters thereof.

The polymeric additives of this invention can also be used with pressure sensitive adhesives comprising graft copolymers including, for example, the graft copolymers described in copending U.S. application, filed concurrently herewith, and assigned to the same entity of the present invention.

In certain embodiments, the adhesive compositions of the present invention, which comprise a polymeric additive, may be conveniently and advantageously prepared in situ with an adhesive polymer or copolymer using a two-stage process. In certain preferred embodiments, a first monomer solution is provided that comprises at least one ethylenically unsaturated monomer. A portion of the first ethylenically unsaturated monomer is polymerized to form a polymeric adhesive. In the second stage, a second monomer solution, that also comprises at least one ethylenically unsaturated monomer, is provided and is preferably polymerized in the presence of a metal chelate chain transfer agent to provide a low molecular weight polymer that acts as an additive (for example as a tackifier) for the first stage adhesive polymer.

In an alternative embodiment of the present invention, in the first stage, the first monomer solution is provided that comprises at least one ethylenically unsaturated monomer and is preferably polymerized in the presence of a metal chelate chain transfer agent to provide a polymeric additive that comprises a low molecular weight polymer. In the second stage, a second monomer solution is provided that also comprises at least one ethylenically unsaturated monomer and is preferably polymerized to form a polymeric adhesive.

In embodiments where the polymeric additive is prepared in the first stage, the monomers within the low molecular weight polymer are preferably selected to minimize reactivity of any unsaturation introduced by the metal chelate chain transfer agent. The term "reactivity", as used herein, relates to the reactivity ratio, or the ability to produce homopolymers or copolymers. Ethylenically unsaturated monomers which have greater reactivity include, for example, monomers in which the double bond is activated, for example, as in the case of methylacrylate, methyl methacrylate and vinyl acetate. Ethylenically unsaturated monomers which have lower reactivity include, for example, monomers in which the double bond is not activated, for example, as in the case of styrene. In addition, the reactivity of any particular monomer, relative to other monomers, is generally reduced as the substitution on the unsaturated carbon atoms increases. For example, in certain embodiments, styrene may preferably be selected as the monomer within the low molecular weight polymer emulsion in the first stage because unsaturation generated within this polymer from the metal chelate chain transfer agent has a lessened tendency to polymerize with the second stage adhesive composition and remains as a low molecular weight polymeric additive.

For efficiency, these two stages may preferably be conducted in a single vessel to prepare the adhesive formulation. For example, in the first stage, the low molecular weight polymer aqueous emulsion may be formed by polymerizing in an aqueous emulsion at least one first ethylenically unsaturated monomer to form water insoluble low molecular weight polymer particles. This first stage polymerization is preferably conducted using a transition metal chelate chain transfer agent as previously described herein. After forming the low molecular weight polymer aqueous emulsion, a second monomer emulsion, that comprises at least one second ethylenically unsaturated monomer and an initiator, is prepared and then polymerized to provide a polymeric adhesive. The second emulsion polymerization is preferably performed in the same vessel to polymerize at least a portion of the unreacted first ethylenically unsaturated monomer with at least a portion of the polymeric adhesive mixture. The second stage may be conducted, for example, by directly adding (e.g., all at once or by a gradual feed) the second monomer emulsion to the low molecular weight polymer aqueous emulsion. An advantage of this embodiment is that it is unnecessary to isolate the low molecular weight polymer, and the second polymerization can take place simply by adding the second monomer emulsion, that comprises at least one second ethylenically unsaturated monomer and initiator, to the low molecular weight polymer aqueous emulsion and then polymerizing to form the adhesive composition.

The adhesive compositions of the present invention may, optionally, further include other additives known in the art such as, for example, emulsifiers, pigments, fillers, curing agents, thickeners, humectants, wetting agents, defoamer, biocides, adhesion promoters, colorants, additional chemical classes of tackifying resins, UV stabilizers, waxes, antioxidants, and the like.

An adhesive article may be made by applying a coating of the adhesive composition of the present invention to a primary substrate and allowing the coating to dry, thereby providing an adhesive layer consisting of the solids portion of the adhesive composition covering a portion of the surface of the substrate.

The coating of adhesive composition can generally be applied to at least a portion of at least one surface of the primary substrate by any convenient method such as, for example, roll coating, wire-wound rod coating, slot die coating, gravure coating, knife coating, hot melt coating, or curtain coating, and allowed to dry to form a dry adhesive layer on the coated portion of the surface of substrate. The adhesive composition may also be applied as a continuous coating or a discontinuous coating on the surface of the primary substrate.

In one embodiment, the adhesive composition may be applied to a surface of the primary substrate in an amount effective to provide a dry adhesive layer 5 grams per square meter ($g/m^2$) to 100 $g/m^2$ on the coated portion of the surface of the primary substrate.

In a further embodiment, the primary substrate may be a flexible, sheet-like material such as, for example, a sheet of paper, a polymer film, a textile fabric or a nonwoven fiber sheet, and the adhesive article of the present invention is correspondingly a sheet-like material such as, for example, a pressure sensitive adhesive tape, a pressure sensitive adhesive label or a pressure sensitive adhesive film.

In a preferred embodiment, the adhesive article is an adhesive tape having an adhesive coated surface and an opposite non-coated surface. In a preferred embodiment, the article may include a release layer, e.g., a polymer film, for temporarily covering the adhesive layer prior to use. In an alternative preferred embodiment, wherein an adhesive tape is provided in the form of a concentrically wound roll, the non-coated surface of the underlying layer of tape functions as a release layer for the adhesive layer.

Alternately, the adhesive can be applied and dried on a release substrate (release liner paper) and dry transfer coated to primary substrates like paper or film labels.

The adhesive composition may be applied to more than one surface of the primary substrate, for example, both sides of a strip of a polymer film may be coated to make a "double-sided" adhesive tape.

The adhesive articles of the present invention can be used by removing the release layer, if present, from the article and then applying an adhesive coated surface of the adhesive article to one or more secondary substrates or to one or more portions of a single secondary substrate to form a composite article wherein the substrates or primary substrate and secondary substrate portions are bonded together by an interposed dry adhesive layer.

Preferred secondary substrates include, but are not limited to, sheet-like materials such as, for example, paper products such as papers and paperboards, cardboards, corrugated cardboards, wood, metal films, polymer films and composite substrates. The terminology "composite substrates" as used herein means substrates consisting of a combination of dissimilar substrate materials such as polymer-coated paperboards or cardboards such, for example, wax-coated cardboard, and bonded wood products such as, for example, particle boards.

The invention is further described in the following examples. In the following examples, Examples 1 and 2 are actual examples. Examples 3 and 4 are prophetic examples. These examples are for illustrative purposes only.

In the examples, monomer conversion was determined by GC analysis of unreacted monomer using standard methods. Weight percent solids for polymer dispersions were determined by gravimetric analysis. Particle size of the polymer dispersions were obtained using a Matec CHDF 2000 particle size analyzer equipped with a HPLC type Ultra-violet detector. The $T_g$ values measured using a differential scanning calorimeter (Model 12920, TA Company) by scanning the temperature range of $-100°$ C. to $+150°$ C. at a rate of $20°$ C. per minute and reporting the midpoint of the $T_g$ transition provided by the scan as the $T_g$ value for the polymer.

Except where noted differently, the low molecular weight polymer was measured for number average molecular weight by SEC using a polystyrene standard from Polymer Laboratories (PS-1) having a peak average molecular weight ranging from 580 to 7,500,000 with narrow molecular weight distribution. Conversions from polystyrene to PMMA were made using Mark-Houwink constants. Copolymer compositions were evaluated for number average molecular weight and weight average molecular weight using SEC as described above.

The following abbreviations shown in Table 1 are used in the examples:

TABLE 1

Abbreviations

| Abbreviation | |
| --- | --- |
| A-16-22 | Polystep A-16-22, anionic surfactant, supplied as 22% solids by Stepan Company, located in Northfield, Illinois |
| APS | Ammonium persulfate |
| BA | Butyl acrylate |
| BD | Butadiene |
| BMA | Butyl methacrylate |
| CoBF | Co(II)-(2,3-dioxyiminobutane-BF$_2$)$_2$ |
| CVA | 4,4-azobis(4-cyanovaleric acid) |
| DBS | Dodecyl benzene sulfonate |
| n-DDM | n-dodecylmercaptan |
| Fe | 0.15% Ferrous sulfate in water |
| GC | Gas chromatograph |
| SEC | Size exclusion chromatography |
| PLC | High performance liquid chromatography |
| Init. | Initiator |
| IR | Infrared spectroscopy |
| LCCC | Liquid chromatography under critical conditions |
| MAA | Methacrylic acid |
| MMA | Methyl methacrylate |
| Mn | Number average molecular weight |
| NaMBS | Sodium metabisulfite |
| NaPS | Sodium persulfate |
| nDDM | Dodecyl mercaptan |
| OT-100 | Aerosol OT-100, anionic surfactant, supplied as 100% active by Cytec Industries Inc., located in Morristown, New Jersey. |
| STY | Stryrene |
| Wako VA-044 | 2,2'-azobis[2-(2-imidazolin2-2yl)propane] dihydrochloride |

EXAMPLE 1

1.1 through 1.2

The following examples are directed to the preparation of polymeric additives by emulsion polymerization using the following general procedure.

Acrylic-polymeric emulsions were prepared by emulsion polymerization processes conducted in a 5 liter, four neck round bottom reaction flask equipped with a mechanical stirrer, temperature control device, condenser, monomer feed line and a nitrogen inlet according to the following procedure. The specific amounts of water, surfactant, monomer, chain transfer agent (CTA), and initiator used are shown in Table II. These ingredients were added according to the following procedure. In a different flask from the reaction flask, a monomer solution was prepared by dissolving the chain transfer agent in the monomer under a nitrogen purge. Deionized water and surfactant, A-16-22, were introduced into the reaction flask at room temperature to form a water surfactant solution. The water surfactant solution was mixed and heated to 80° C. with stirring under a nitrogen purge. Upon reaching a temperature of 80° C., and upon complete dissolution of the surfactant, the initiator (cyanovaleric acid) was added to the water surfactant solution with stirring for 1 minute to permit the initiator to dissolve. After dissolution of the initiator, the monomer solution was fed over a period of 1 hour, with stirring, to form a reaction mixture. At the end of the feed period, the reaction mixture was maintained at 80° C. for an additional 3.5 hours. The reaction mixture was then cooled to 40° C. At 40° C., 13.3 g of $FeSO_4$ solution (0.15%) was added followed by two sets of redox initiator solution containing t-butyl peroxide (4.4 g in 14 g of water) and SFS (2.1 g in 14 g of water) in each set at an interval of 15 minutes. The final reaction mixture was cooled to room temperature and passed through a filter cloth to remove any coagulum.

Generally, the resulting acrylic tackifier emulsion contained less than 5 weight percent coagulum based on the total weight of low molecular weight polymer, and the conversion of monomer was over 99 weight percent, based on the total weight of monomer added. The Mn, weight percent solids and particle size for each low molecular weight polymer are reported in Table II. The weight percentage of the monomers comprising the acrylic tackifiers of Example 1.1 through Example 1.2 was 48% by weight MMA, 50% by weight BMA, and 2% by weight MAA; 98% by weight BMA and 2% by weight MAA, respectively.

TABLE II

Low Molecular Weight Polymeric Additives Prepared by Emulsion Polymerization

| Example | $H_2O$ (g) | Surf. (g) (3) | MMA (g) | BMA (g) | MAA (g) | CTA (ppm) (1) | Init. (g) (2) | Part. Size (nm) | Mn | Wt % solids |
|---|---|---|---|---|---|---|---|---|---|---|
| 1.1 | 1700 | 62.8 | 691.2 | 720 | 28.8 | 118 | 14.4 | 196 | 1149 | 39.7 |
| 1.2 | 1750 | 55 | 0 | 1173 | 28.9 | 18 | 12.6 | 98 | 7327 | 41 |

(1) ppm moles of chain transfer agent (CoBF) based on total moles of monomer.
(2) CVA, supplied by Aldrich as a 75 weight percent solid.
(3) Dodecylbenzene sulfonate.

EXAMPLE 2

2.1 through 2.9

Adhesion Testing

The polymeric additives in the preceding examples were combined with a water-based, acrylic pressure sensitive adhesive emulsion sold under the trade name ROBOND™ PS-95N Emulsion (Rohm and Haas, Inc., Philadelphia, Pa.) in the weight percentages reflected in Table III. The resulting adhesive compositions were tested for adhesion properties. The emulsion-polymerized polymeric additives were treated with a 28% aqueous ammonium hydroxide solution to obtain a pH which ranges between 8 and 9. Each of the above emulsions were then blended at various levels with the acrylic emulsion adhesive and then pH adjusted to 9 by addition of ammonium hydroxide solution. Five adhesive compositions of varying amounts of the polymeric additives of examples 1.1 and 1.2 and adhesive emulsion were prepared and are shown as examples 2.2 through 2.6 in Table III.

As a comparison to the polymeric additives or tackifiers of the present invention, adhesive compositions incorporating a tackifying, synthetic resin dispersion sold under the commercial name, TACOLYN™ 1070 Tackifier Dispersion, manufactured by Hercules, Inc. of Wilmington, Del. were also prepared and are shown as Comparative Examples 2.7, 2.8, and 2.9 of Table III. As a further comparison, an acrylic adhesive was prepared without the addition of the polymeric additives of the present invention, or commercially available polymeric additives, and is shown as Comparative Example 2.1 of Table III.

TABLE III

Polymeric Additive-Adhesive Blends
(based on 100 parts by weight of total composition)

| Example: | 2.1 Comp. | 2.2 | 2.3 | 2.4 | 2.5 | 2.6 | 2.7 Comp. | 2.8 Comp. | 2.9 Comp. |
|---|---|---|---|---|---|---|---|---|---|
| 1.1 | | 10% | 25% | 40% | | | | | |
| 1.2 | | | | | 10% | 25% | | | |
| Tacolyn | | | | | | | 10% | 25% | 40% |
| Robond | 100% | 90% | 75% | 60% | 90% | 75% | 90% | 75% | 60% |

Test adhesive tapes of the adhesive compositions in Examples 2.1 through 2.9 of Table III were made by applying the adhesive-additive blends onto RP-12 silicone coated kraft release liner from Chemsultants using a bird applicator. The test adhesive tapes were dried at 180° F. for 15 minutes. The thickness of the dried adhesive films was 0.8 mils. The coated release liner was then applied to Pressmaster Offset paper facestock and nipped with 30 psi pressure. The laminates were cut into 1-inch wide strips and aged overnight prior to testing.

Peel strength was measuring using Pressure Sensitive Tape Council ("PSTC") Method 1. One inch test strips were prepared in accordance to the method provided above. The one inch wide test strips were applied to stainless steel panels, high density polyethylene ("HDPE") panels, and corrugated cardboard using a 4.5 lb roller. The test strips were allowed to dwell for 2 minutes before testing peel at an angle of 90_ at a rate of 12 inches per minute using a tensile tester. Mode of failure is indicated by an A for adhesive failure; AL for adhesive legginess; PP for paper picking; C for cohesive failure; LF for light cardboard fiber pull; and VLF for light cardboard fiber pull.

Tack was measured using Tag and Label Manufacture's Institute Loop Tack Tester.

The shear resistance of each of the adhesive compositions was measured in accordance with Pressure Sensitive Tape Council Method 7. One end of an adhesive strip made according to the method set forth above was applied to a stainless steel panel so that the strip contacted a 1 inch by 1 inch portion of one edge of the panel. The strip was trimmed so that only a 2 inch portion over hung the edge of the panel. The panel was hung in a position 2 degrees from vertical with a 1 kilogram weight suspended from the overhanging portion of adhesive strip. The time required for the strip to slip off the panel was then measured.

The results of the peel strength, tack, and shear resistance for Examples 2.1 through 2.9 are set forth in Table IV.

TABLE IV

Adhesive Performance

| Examples: | 2.1 Comp. | 2.7 Comp. | 2.2 | 2.5 | 2.8 Comp. | 2.3 | 2.6 | 2.9 Comp. | 2.4 |
|---|---|---|---|---|---|---|---|---|---|
| Peel Strength: | | | | | | | | | |
| Stainless Steel | 2.00 AL | 2.04 AL | 1.76 AL | 1.51 AL | >2.69 PF | >2.34 PG | 1.27 AL | >3.16 PF | >3.16 PF |
| HDPE | 0.96 A | 1.35 A | 1.23A | 1.06A | 1.83 A | 1.52 A | 0.79 AL | >2.47 PF | >1.93 A |
| Corrugated Cardboard | 0.67 AL | 0.91 AL | 1.04 AL | 0.86 AL | 1.34 LF | 1.21 AL | 0.42 A | 1.21 AL | 1.13 AL |
| Tack: | | | | | | | | | |
| Stainless Steel | 3.56 A | 3.87 A | 3.88A | 2.65 A | 5.14 PP | 4.62 A | 1.40 A | 4.62 A | 3.12 PP |
| HDPE | 2.20 A | 2.65 A | 2.35A | 1.65 A | 2.09 LF | 3.22 A | 0.84 AL | 3.22 A | 2.86 AS |
| Corrugated Cardboard | 1.29 A | 1.53 VLF | 1.80 VLF | 1.22 A | 94.5 C | 1.77 VLF | 0.37 A | 1.77 VLF | 2.44 LF |
| Shear: (Creep Resistance): | 82.4 C | 54.9 C | 63.3 C | 97.7 C | 94.5 C | 42.0 C | 11.2 C | 42.0 C | 17.4 C |

As Table IV illustrates, the polymeric additives within Examples 2.2, 2.3, and 2.4 act as tackifiers in the adhesive system by improving the overall tack and peel strength of the adhesive in comparison to Example 2.1. By contrast, the polymeric additive within Examples 2.5 and 2.6 act as a plasticizer within the adhesive systems because tack peel and shear were reduced, particularly at the higher level, in 2.6 relative to Example 2.1.

EXAMPLE 3

Preparation of Adhesive Formulation by Two Stage Synthesis Procedure—Polymeric Additive Prepared in the Second Stage A pressure sensitive adhesive formulation comprising a polymeric additive is prepared in accordance with the method of the present invention in two aqueous emulsion polymerization stages wherein the polymeric additive is prepared in the second stage.

An adhesive-additive emulsion is prepared in a four neck, 5 liter round bottom reaction flask equipped with a mechanical stirrer, temperature control device, condenser, monomer feed line and a nitrogen inlet. In the first stage, the reaction flask is charged with 1400 g of deionized water and is heated to 90° C. under a nitrogen purge. In a separate vessel, a first monomer emulsion is prepared by mixing 340 g of deionized water, 17.4 g of A-16-22 surfactant, 1568 g of BA and 32 g of MAA. A solution of 6 g of ammonium persulfate within 75 g of water is added to the reaction flask. Shortly thereafter, the first monomer emulsion is fed into the reaction flask over a period of 90 minutes while maintaining at a temperature range of 85–87° C. The reaction mixture is maintained at 85–87° C. for an additional 60 minutes and then the reaction mixture is cooled to 80° C.

In the second stage, a second monomer emulsion is prepared in a separate vessel by dissolving 50 ppm of CoBF (based upon total moles of total moles of monomer used to form the additive) into a solution mixture containing 300 g of BMA, 288 g of MMA and 12 g of MAA under a nitrogen purge. At 80° C., an amount of 6 g of initiator (CVA) is added into the reaction mixture from the first stage and allowed to dissolve for 1 minute. The second monomer solution is then fed into the reaction mixture over a period of 30 minutes. At the end of the feed period, the reaction mixture is maintained at 80° C. for an additional 3.5 hours. The reaction mixture is then cooled to 40° C. At 40° C., a quantity of 13.3 g of $FeSO_4$ solution (0.15%) is added to the reaction mixture which is then followed by two sets of redox initiator solution, containing t-butyl peroxide (4.4 g in 14 g of water) and SFS (2.1 g in 14 g of water) in each set, at 15 minute intervals. The final reaction mixture is cooled to room temperature and passed through a filter cloth to remove any coagulum.

EXAMPLE 4

Preparation of Adhesive Formulation by Two Stage Synthesis Procedure—Polymeric Additive Prepared in the First Stage A pressure sensitive adhesive formulation comprising a polymeric additive is prepared in accordance with the method of the present invention in two aqueous emulsion polymerization stages wherein the polymeric additive is prepared in the first stage.

An adhesive-additive emulsion is prepared in a four neck, 5 liter round bottom reaction flask equipped with a mechanical stirrer, temperature control device, condenser, monomer feed line and a nitrogen inlet. In the first stage, the reaction flask is charged with 708 g of deionized water and 26.2 g of a surfactant, and A-16-22, to form a water surfactant solution. The water surfactant solution is heated to 80° C. with stirring under a nitrogen purge. In a separate vessel, a first monomer solution is prepared by dissolving 49.2 ppm of the CoBF chain transfer agent in a first monomer mixture containing 240 g of MA, 348 g of Styrene, and 12 g of MAA under a nitrogen purge. Upon reaching a temperature of 80° C., and upon complete dissolution of the surfactant, 6 g of initiator (CVA) is added to the water surfactant solution with stirring for 1 minute to permit the initiator to dissolve. After dissolution of the initiator, the first monomer solution is fed over a period of 1 hours, with stirring, to form a reaction mixture. At the end of the feed period, the reaction mixture is maintained at 80° C. for an additional 3.5 hours and then heated to 85° C.

In a separate vessel, a second monomer emulsion is prepared by mixing 340 g of deionized water, 17.4 g of the surfactant, A-16-22, 1568 g of BA and 32 g of acrylic acid. A solution of 6 g of ammonium persulfate in 75 g of water is added to the reaction mixture from the first stage emulsion at 85° C. which is followed by feeding of the second monomer emulsion over a period of 90 minutes while maintaining the temperature at 85° C. At the end of the feed period, the reaction mixture is maintained at 85° C. for an additional 60 minutes and then cooled to 40° C. At 40° C., 13.3 g of FeSO4 solution (0.15%) is added followed by two sets of redox initiator solution, containing t-butyl peroxide (4.4 g in 14 g of water) and SFS (2.1 g in 14 g of water) in each set, at an interval of 15 minutes. The final reaction mixture is cooled to room temperature and passed through a filter cloth to remove any coagulum.

We claim:

1. An adhesive composition comprising:
   (a) adhesive polymers or copolymers prepared from monomers selected from the group consisting of styrene, butadiene, acrylonitrile, ethylene, vinyl acetate, acrylic acid, esters of acrylic acid, methacrylic acid, esters of methacrylic acid and combinations thereof; and
   (b) from 1 to 55%, on a dry weight basis, of a polymeric additive comprising a low molecular weight polymer having a number average molecular weight of 20,000 or less and which comprises:
      (i) polymerized units of at least one ethylenically unsaturated monomer; and
      (ii) 5 weight percent or less of a polymerized acid-containing monomer,
   wherein said low molecular weight polymer is polymerized in the presence of a metal chelate chain transfer agent;
   wherein said low molecular weight polymer is a macromonomer capable of being polymerized in a free radical polymerization process;
   wherein said low molecular weight polymer contains, as polymerized units, no mercapto-olefin compounds; and
   wherein said low molecular weight polymer is water-insoluble, having a water solubility equal to or less than 150 millimoles/liter at 25° C. to 50° C.

2. The composition of claim 1 wherein said low molecular weight polymer has a number average molecular weight of 9,000 or less.

3. The composition of claim 1 wherein said low molecular weight polymer has a number average molecular weight of from 600 to 4000.

4. The composition of claim 1 wherein said ethylenically unsaturated monomer is selected from the group consisting of methyl methacrylate, ethyl methacrylate, 2-ethylhexyl methacrylate, isobornyl methacrylate, butyl methacrylate, lauryl methacrylate, stearyl methacrylate, butyl acrylate, ethyl acrylate, methyl acrylate, styrene, methyl styrene, and a-methyl styrene, and combinations thereof.

5. The composition of claim 1 wherein said low molecular weight polymer comprises by weight 10 to 90% butyl methacrylate, 10 to 90% methyl methacrylate and 0 to 5% free-radical polymerizable olefinic acid.

6. A composition of claim 5 wherein said olefinic acid is methacrylic acid.

7. Pressure sensitive adhesive coated sheet material comprising a flexible backing having a coating of the composition of claim 1.

8. A method for in-situ generation of a polymeric additive in an adhesive composition, the method comprising:
   (a) polymerizing at least one first ethylenically unsaturated monomer to provide an adhesive polymer or copolymer;

(b) polymerizing, in the presence of said adhesive polymer or copolymer, a polymeric additive comprising a low molecular weight polymer having a number average molecular weight of 20,000 or less and which comprises:
  (i) polymerized units of at least one second ethylenically unsaturated monomer; and
  (ii) 5 weight percent or less of a polymerized acid-containing wherein said low molecular weight polymer is formed in the presence of a metal chelate chain transfer agent;

wherein said low molecular weight polymer is a macromonomer capable of being polymerized in a free radical polymerization process;

wherein said low molecular weight polymer contains, as polymerized units, no mercapto-olefin compounds; and wherein said low molecular weight polymer is water-insoluble, having a water solubility equal to or less than 150 millimoles/liter at 25° C. to 50° C.

9. The composition of claim 1 wherein said acid-containing monomer is present at 2 weight percent or less of said low molecular weight polymer.

10. The composition of claim 1 wherein said acid-containing monomer is present at 1 weight percent or less of said low molecular weight polymer.

11. The composition of claim 1 wherein said acid-containing monomer is present at zero weight percent of said low molecular weight polymer.

12. The method of claim 8 wherein said low molecular weight polymer has a number average molecular weight of 9,000 or less.

13. The method of claim 8 wherein said low molecular weight polymer has a number average molecular weight of from 600 to 4000.

14. The method of claim 8 wherein said ethylenically unsaturated monomer is selected from the group consisting of methyl methacrylate, ethyl methacrylate, 2-ethylhexyl methacrylate, isobornyl methacrylate, butyl methacrylate, lauryl methacrylate, stearyl methacrylate, butyl acrylate, ethyl acrylate, methyl acrylate, styrene, methyl styrene, and a methyl styrene, and combinations thereof.

15. The method of claim 8 wherein said low molecular weight polymer comprises by weight 10 to 90% butyl methacrylate, 10 to 90% methyl methacrylate and 0 to 5% free-radical polymerizable olefinic acid.

16. The method of claim 8 wherein said olefinic acid is methacrylic acid.

17. The method of claim 8 wherein said acid-containing monomer is present at 2 weight percent or less of said low molecular weight polymer.

18. The method of claim 8 wherein said acid-containing monomer is present at 1 weight percent or less of said low molecular weight polymer.

19. The method of claim 8 wherein said acid-containing monomer is present at zero weight percent of said low molecular weight polymer.

* * * * *